United States Patent [19]
Amacker

[11] Patent Number: 5,090,505
[45] Date of Patent: Feb. 25, 1992

[54] TREE CLIMBING STAND

[76] Inventor: Joseph A. Amacker, 1212 Main St., Delhi, La. 71232

[21] Appl. No.: 553,653

[22] Filed: Jul. 18, 1990

Related U.S. Application Data

[63] Continuation of Ser. No. 336,793, Apr. 12, 1989, Pat. No. 4,969,538.

[51] Int. Cl.⁵ ............................................... A47C 9/00
[52] U.S. Cl. ...................................... 182/187; 182/136
[58] Field of Search ................ 182/187, 188, 133.6, 182/152; 108/152

[56] References Cited

U.S. PATENT DOCUMENTS

| | | | |
|---|---|---|---|
| 3,955,645 | 5/1976 | Dye | 182/187 X |
| 4,137,995 | 2/1979 | Fonte | 182/136 X |
| 4,321,983 | 3/1982 | Nelson | 182/136 |
| 4,331,216 | 5/1982 | Amacker | 182/136 X |
| 4,369,858 | 1/1983 | Babb | 182/187 X |
| 4,802,552 | 2/1989 | Williams | 182/187 |

Primary Examiner—Karen J. Chotkowski
Attorney, Agent, or Firm—Wigman & Cohen

[57] ABSTRACT

A tree climbing stand utilizing two climbing elements. Also provided are spring actuated element for locking the tree stand in its expanded, operational position, a retractable safety bar for supporting the back of the climber, and a cleat, which may be included or excluded at the discretion of the user, for engaging the tree.

1 Claim, 2 Drawing Sheets

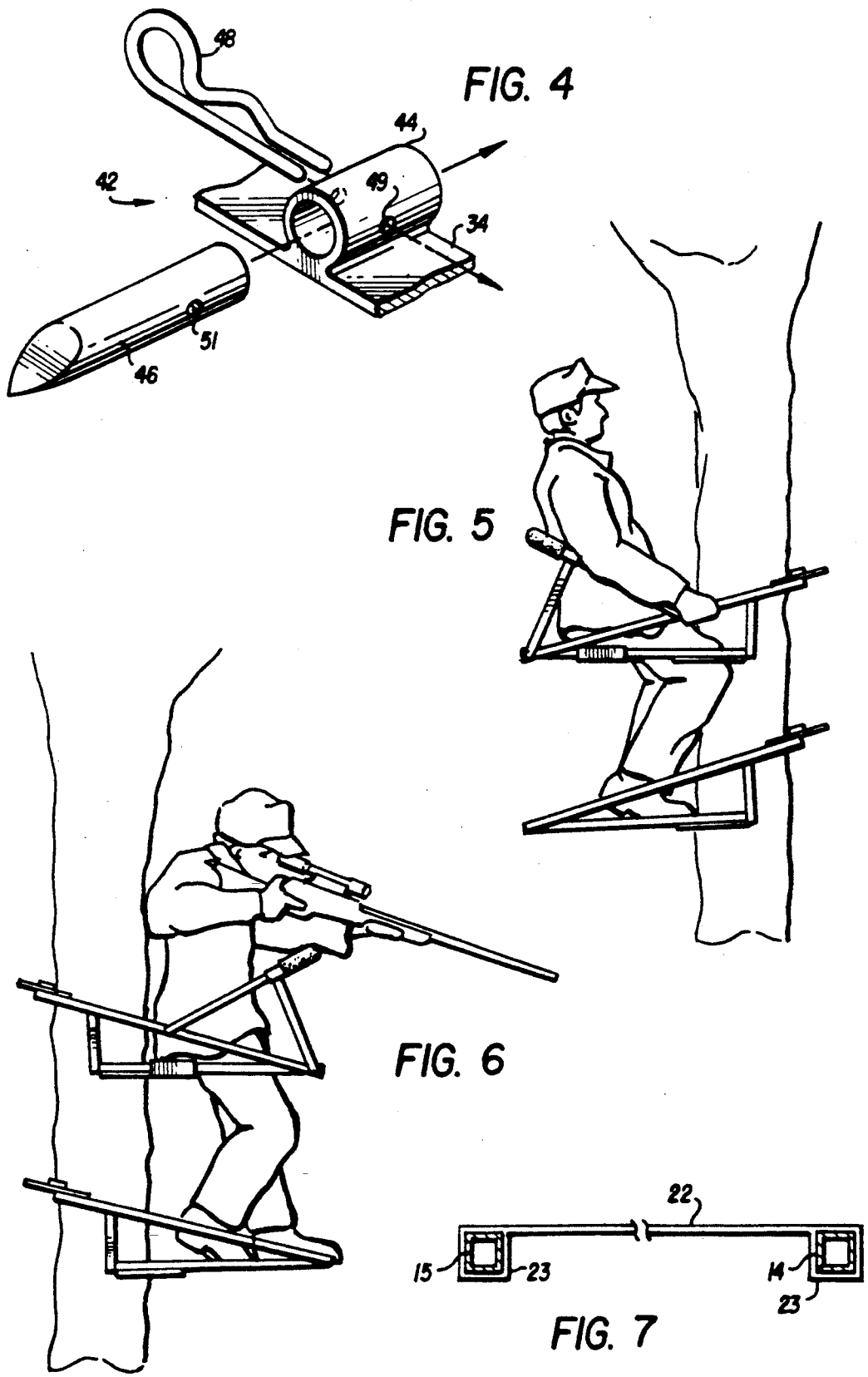

TREE CLIMBING STAND

This is a continuation of co-pending application Ser. No. 07/336,793 filed on Apr. 12, 1989, now U.S. Pat. No. 4,969,538.

BACKGROUND OF THE INVENTION

1. Field of the Invention

The present invention relates to pole grasping-type climbers utilizing alternate grasping structures and, more particularly, to stands formed of two climbing members which are alternately raised by the user to attain a desired elevation in a tree, or on a pole or the like.

2. Description of the Prior Art

The present invention is an improvement over my climbing stand, U.S. Pat. No. 4,331,216 (hereinafter the '216 patent). This earlier device, like the prior art in general, has several features in need of improvement.

First, referring to the '216 patent, in order to move the seat 5 from the forward to rearward positions shown in FIGS. 1 and 6 respectively, the platform must be disengaged from bar means 33 and 34. Moving the platform in such a manner has been found to be cumbersome and awkward for the user especially when done while elevated in the tree.

A second limitation of the '216 patent and the prior art in general is the fact that cleats 6 and 18 cannot be easily removed to enable the stand to be used legally in jurisdictions which proscribe the use of cleats.

A third shortcoming of the '216 patent and the prior art in general is the lack of a structure upon which the user may rest his back while climbing in the manner illustrated in FIGS. 4 and 5 of the '216 patent.

A fourth limitation of the '216 patent is the lack of means for securing telescoping members 13, 43, and 27 within side support bars 33, 34, 28 and 48 when the stand is in its operating position as shown in FIG. 1. This lack of locking means allows the climbing stand to collapse during the climbing operation thereby causing injury to the user.

Therefore, the primary drawbacks of the prior art are the difficulty in moving the seat, the inability of removing the cleats, the lack of support upon which the user can rest his back while climbing and the absence of means for locking the telescoping elements of the apparatus when the apparatus is in its operating, as opposed to collapsed position.

SUMMARY AND OBJECTS OF THE INVENTION

In view of the foregoing limitations and shortcomings of the prior art devices, as well as other disadvantages not specifically mentioned above, it should be apparent that there still exists a need in the art for a climbing stand which is safe and simple to use, both during and after placement on the tree, pole or the like, and during the removal therefrom. It is, therefore, a primary objective of this invention to fulfill this need by providing a simple, reliable climbing stand comprised of two frame members which surround the tree, pole, etc. These frame members include platforms upon which the user can either sit or stand while facing the tree, pole, etc., and can receive continual support from the rear.

More particularly, it is an object of this invention to provide a climbing stand comprised of an upper frame member and a lower frame member. The upper frame member includes a gripping means to engage the side of the tree or pole opposite the user and further includes a slidable platform which is spaced from the tree to accommodate the body of the user in a sitting position.

Another object of the present invention is to provide a tree climbing stand which includes cleats which can be easily removed or re-attached at the discretion of the user.

Still another object of the present invention is to provide a tree climbing stand which includes a safety bar for supporting the user when he is in either a climbing or hunting position.

A further object of the present invention is to provide a tree climbing stand capable of collapsing for ease in transport and storage, and including means for quickly and automatically locking the device when it is in its expanded mode, thereby allowing fast and safe operation.

These and other objects and advantages of the present invention will become apparent by reference to the more detailed description which follows, as well as to the appended claims and the several view illustrated in the drawings.

BRIEF DESCRIPTION OF THE DRAWINGS

FIG. 2 is a side view of the upper frame member of the embodiment illustrated in FIG. 1;

FIG. 4 is an enlarged perspective view of the removable cleat mechanism of the present invention;

FIG. 5 illustrates the step of lifting the lower frame member along the height of a tree in operating the present invention;

FIG. 6 illustrates the present invention in its fully operating condition for use by the hunter with the movable seat having been slid to a position adjacent to the tree; and FIG. 7 is a front view of the seat of the present invention.

DETAILED DESCRIPTION OF A PREFERRED EMBODIMENT

Figure 1:
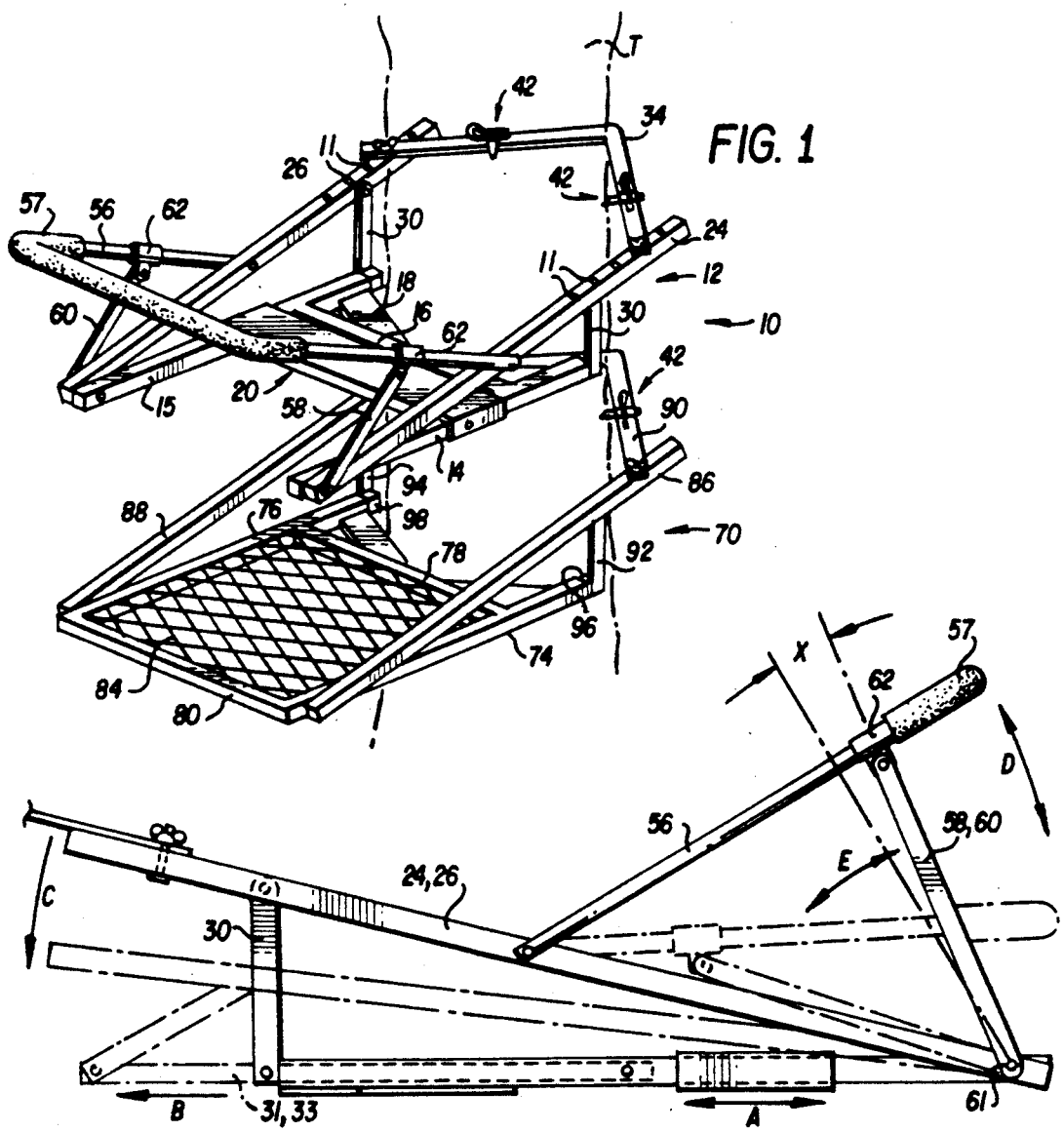
FIG. 1 is a perspective view of a preferred embodiment of the tree climbing stand of the present invention in its expanded, operating mode.

Referring more specifically to the drawings wherein like numerals indicate like elements throughout the several views, there is illustrated in FIG. 1 of the drawings a preferred embodiment of the tree climbing stand apparatus of the present invention designated generally by reference numeral 10.

Referring now in particular to FIG. 1, stand apparatus 10 includes an upper frame member generally designated by reference numeral 12. Upper climbing element 12 is characterized by a pair of generaly parallel spaced side bars 14,15, preferably formed of steel or aluminum hollow square tubing. Side bars 14,15 are spaced by a fixed cross bar 16, having a length sufficient to allow tree trunks to fit between side bars 14,15. A lower gripping wedge 18 is mounted between side bars 14,15 for engagement with the tree or column. A seat 20 is slidably mounted between side bars 14,15 such that the seat can slide back and forth as indicated by arrow A in FIG. 2. As best seen in FIG. 7, seat 20 preferably comprises a platform 22 which is mounted at each end to a pair of rectangular sleeves 23 which surround side bars 14,15 such that seat 20 is captured by the side bars. In addition to supporting the user as shown in FIGS. 5 and 6, seat 20 functions as a structural support for side bars 14,15. The inclusion of this additional support allows the elimination of a second fixed cross bar (designated 32 in the '216 patent) which was found to be uncomfortable to the user.

A pair of generally parallel diagonal bars 24 and 26 are hingedly mounted to the ends of side bars 14 and 15 respectively opposite the tree or upright column member T.

An upper gripping wedge 34 is removably mounted to the ends of side bars 24,26 for engagement with the back side of the tree as shown in FIG. 1. Removable mounting may be accomplished by means of conventional bolt and wing-nut assemblies which extend through apertures in the wedge. A plurality of apertures 11 are provided in diaganol bars 24,26 to allow the distance between lower gripping wedge 18 and upper gripping wedge 34 to vary depending o the width of tree T.

A pair of removable cleat assemblies, designated generally by reference numeral 42 mounted in spaced relation to each other on gripping wedge 34 for engaging tree T. As seen in FIG. 4, cleat assembly 42 comprises a tubular housing 44 mounted as by welding, to gripping wedge 34. A cleat 46 may be removably received in the tubular housing. The tubular housing is provided with a pair of opposed aperatures 49 formed in the side walls of the housing. A removable pin 48 is adapted to engage the aperatures 49 and an aperature (not shown) in cleat 46 whereby the cleat is removably retained. Easy removal of the cleat is provided to enable the tree stand to be used in jurisdictions which prohibit cleats or similar toothed elements which pierce the bark of trees.

A pair of struts 28,30 are pivotably mounted at one end to diagonal bars 24,26 and at their opposite end to a pair of telescoping bars 31,33 (FIG. 2). The telescoping bars are positioned within and in slidable engagement with hollow side bars 14,15.

The arrangement of pivoting diagonal bars 24,26, struts 28,30, and telescoping bars 31,33 function together to allow the climbing element 12 to collapse as shown by the arrows B and C in FIG. 2 to permit ease in transport and storage.

When struts 28,30 are generally perpendicular in relation to side bars 14,16 as illustrated by the solid lines in FIG. 2, climbing element 12 is in its expanded, operational mode. As mentioned, a key disadvantage of the prior art is the fact that the collapsible frame members frequently loose their rigid form during the climbing operation. To remedy this problem, a locking means is provided to retain telescoping bars 31,33 within hollow side bars 14,15 thereby locking the frame members in their expanded, operational mode.

Figure 3:
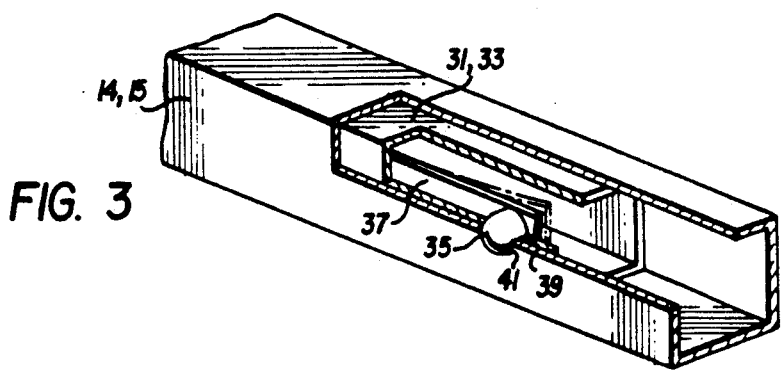
FIG. 3 is an enlarged perspective view partially in section of the locking mechanism of the present invention.

With reference to FIG. 3, this locking means preferably includes a flat spring 37 which is mounted at its first end to the inside of telescoping bars 31,33. At the second end of the flat spring is mounted a pin 35. The pin is biased into engagement with aperatures 39 in the telescoping bar and aperature 41 in the side bar when the two aperatures correspond with each other as shown in FIG. 3.

A U-shaped safety bar 56 is hingedly mounted to diagonal bars 24,26 to provide support for the back of the climber as shown in FIG. 5. Safety bar 56 is preferably constructed of aluminum tubing or the like. Pading 57 constructed of foam rubber is provided. A pair of struts 58,60 are hingedly mounted at one end to bolt 61 and hingedly mounted at the opposite end to a collar 62 (FIG. 2). The collar is slidably engaged with safety bar 56.

In addition to supporting the back of the climber, safety bar 56 functions as a means for supporting rifles and the like during hunting (FIG. 6).

The struts 58,60 and collar 62 function together to allow safety bar 56 to move from an upright position to a collapsed position as shown by arrows D and E in FIG. 2.

As will be understood by those familiar with the art, when collar 62 is within area X, downward pressure on the safety bar will not cause it to collapse. Accordingly, no locking means is required to retain the safety bar 46 in its upright position.

Stand apparatus 10 also includes a lower climbing element generally designated by reference numeral 70. This lower frame member is substantially similar to upper frame member 12 except for the absence of seat 20 and safety bar 56 in the lower frame member 70.

Lower frame member 70 preferably comprises a pair of generaly parallel spaced side bars 74,76 spaced by a plurality of fixed cross bars 78,80. A platform 84, constructed of metal mesh or the like, is mounted between side bars 74,76 to accommodate the feet of the hunter or other user while in a standing, climbing, or sitting position.

A pair of generally parallel diagonal bars 86 and 88 are hingedly mounted to the ends of side bars 74 and 76 respectively.

An upper gripping wedge 90 is removably mounted to the ends of side bars 86 and 88. A pair of removable cleat assemblies 42 are provided on wedge 90. A pair of struts 92 and 94 are pivotably mounted at one end to diagonal bars 86,88 and at their opposite end to a pair of telescoping bars 96 and 98. The arrangement of pivoting diagonal bars, struts, and telescoping bars functions as described above.

The use and operation of the present invention is substantially as described in columns 5 through 7 of the '216 patent.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. Apparatus for climbing a generally vertical member, comprising:
   a climbing element for accommodating the body of a climber, said upper climbing element comprising a generally rectangular frame including at least a pair of upper and lower tubular side members;
   means provided at one end of said upper and lower tubular side members for gripping said vertical member;
   said upper and lower tubular side members being pivotally joined at their respective ends opposite the gripping means; said climbing element characterized by the absence of a cross member disposed between the lower pair of tubular side members at the end of the frame opposite the gripping means;
   a substantially rigid seat slidably secured to said lower pair of tubular side members which provides sufficient structural support to said climbing element and eliminates the need for any additional cross members between the seat and the end of said lower side members opposite the gripping means, said substantially rigid seat being moveable between said gripping means and the juncture of said upper and lower cross members, said moveable seat including means provided at opposite ends for enveloping each of said lower tubular side members respectively during movement from one portion to another while simultaneously providing the necessary structural support to said frame during use;

whereby the legs of the climber are free to move at said end of said frame opposite said gripping means when the climber is seated proximate to said gripping means and facing away from said vertical member.

* * * * *